Aug. 19, 1969  A. M. BOCK  3,462,173
DRAW BAR FOR TOWING VEHICLES
Filed July 31, 1967  3 Sheets-Sheet 1
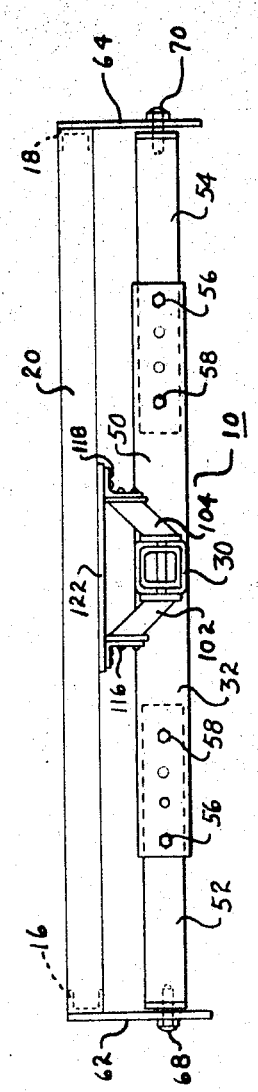
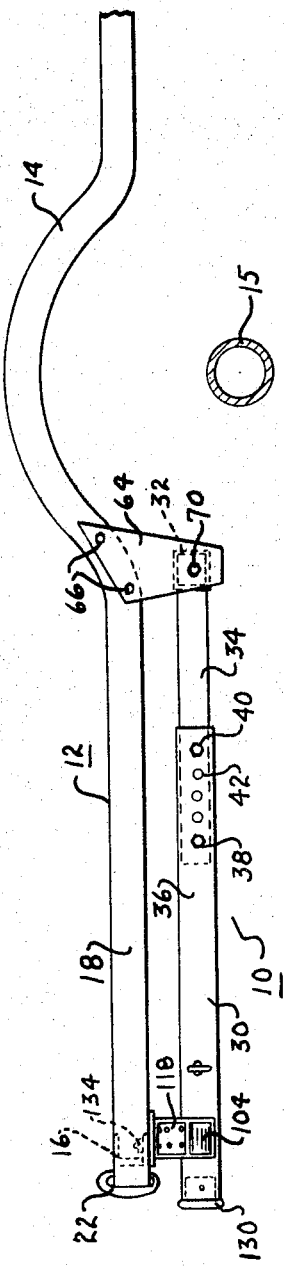
INVENTOR.
AUGUST M. BOCK
BY
M. A. Hobbs
ATTORNEY

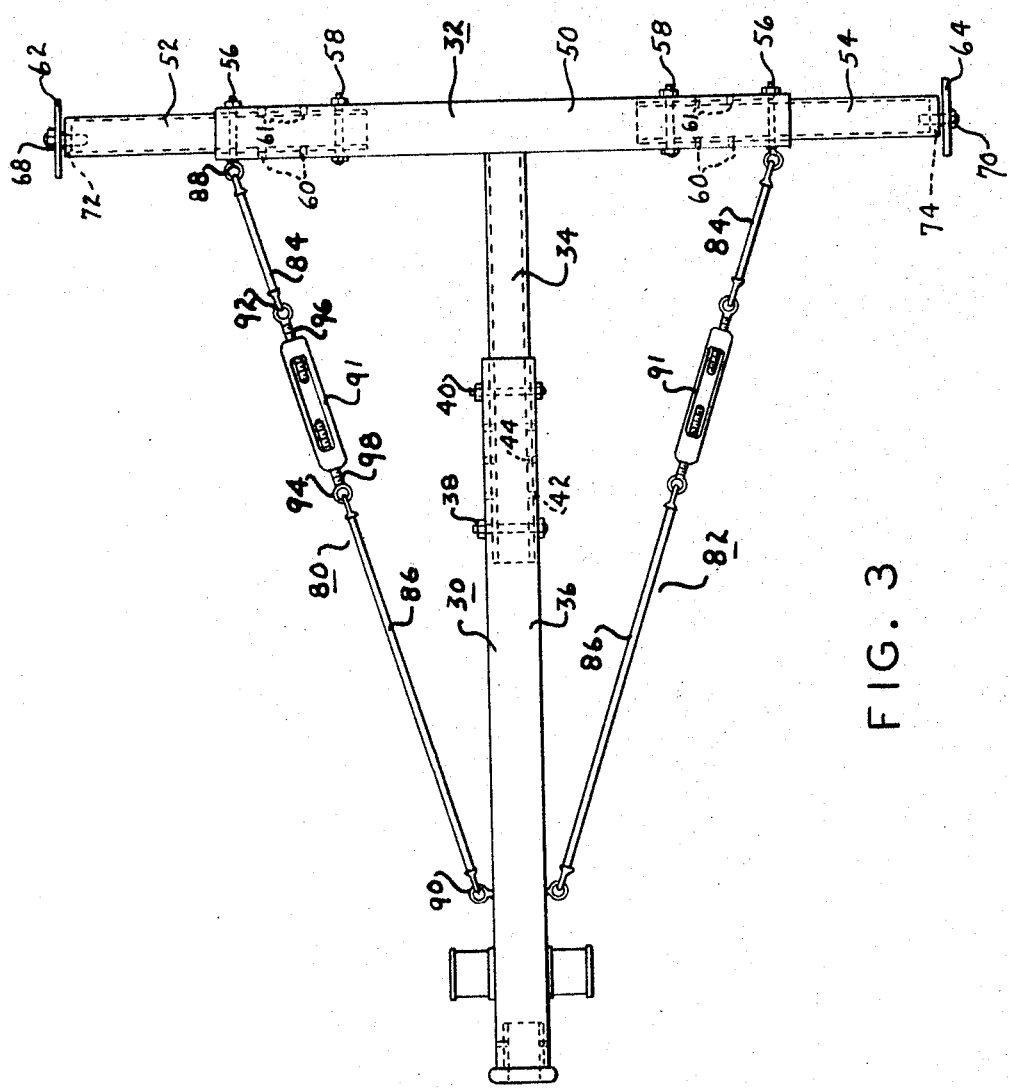

Aug. 19, 1969    A. M. BOCK    3,462,173
DRAW BAR FOR TOWING VEHICLES

Filed July 31, 1967    3 Sheets-Sheet 3

*INVENTOR.*
AUGUST M. BOCK
BY
*ATTORNEY*

United States Patent Office 3,462,173
Patented Aug. 19, 1969

3,462,173
DRAW BAR FOR TOWING VEHICLES
August M. Bock, Elkhart, Ind. 46514
Filed July 31, 1967, Ser. No. 657,261
Int. Cl. B60d 1/14
U.S. Cl. 280—484                          10 Claims

ABSTRACT OF THE DISCLOSURE

A draw bar for towing trailers, mobile homes and the like, which is pivotally attached to the frame of the automobile near the rear axle and which has a longitudinal member extending rearwardly and a rubber-like member or members suspending the draw bar at the rear end under the automobile for free movement in all angular directions.

---

The conventional or standard equipment used in towing trailers and mobile homes normally includes a draw bar connected to the rear part of the automobile and a hitch mounted on the draw bar and attached to and supporting the forward end of the trailer or mobile home. The draw bar, which is sometimes referred to as a tow or hitch bar, is connected at its forward end to the rear axle of the automobile or to the frame in the vicinity of the axle and at its rear end to the rear bumper or the rear part of the vehicle frame. The connection at the forward end is normally a pivoted joint and the connection at the rear end is such as to normally hold the bar firmly or rigidly suspended beneath the bumper with the respective end projecting rearwardly therefrom for receiving the hitch. This type of draw bar-hitch installation often results in the rear of the automobile frame supporting a substantial part of the weight of the forward end of the trailer, causing the vehicles to tilt downwardly at the hitch. This has been partially overcome by the use of load equalizating hitches which tend to transfer a portion of the load normally concentrated at the hitch directly to the rear axle of the towing vehicle and to the trailer wheels, thus distributing the load more uniformly between the two vehicles. Notwithstanding the load equalizing structure, a substantial amount of and often excessive weight is transferred to the rear of the automobile and, with the essentially rigid connection of the rear end of the draw bar connected to the bumper or rear of the frame, the draw bar can not adjust or adapt itself to the various load and road conditions. It is therefore one of the prinicipal objects of the present invention to provide a draw bar construction which effectively shifts the load from the hitch to the frame of the towing vehicle near the rear axle and which permits the rear of the bar to adapt to varying load and road conditions without transferring effectively the load frame or axle of the towing vehicle.

Another object of the invention is to provide a draw bar structure of the aforesaid type which can be readily adjusted to fit all standard automobiles and various models thereof, and which can be easily installed and used without interfering with the normal operation of the automobile when no vehicle is being towed.

Still another object is to provide a draw bar having a flexible connection between the rear part of the bar and the rear member of the automobile frame or bumper so that the bar, in effect, floats while towing a trailer or mobile home, and hence does not place a strain on the rear of the automobile with changes in load and road conditions, and which is so constructed and arranged that it is effectively supported by the rear of the automobile when not in use.

Further objects and advantages of the present invention will become apparent from the following description and accompanying drawings, wherein:

FIGURE 1 is a side elevational view of a draw bar showing it mounted on the frame of an automobile;

FIGURE 2 is a rear end elevational view of the draw bar shown in FIG. 1;

FIG. 3 is a top plan view of the present draw bar showing it removed from the automobile frame;

Figure 4:
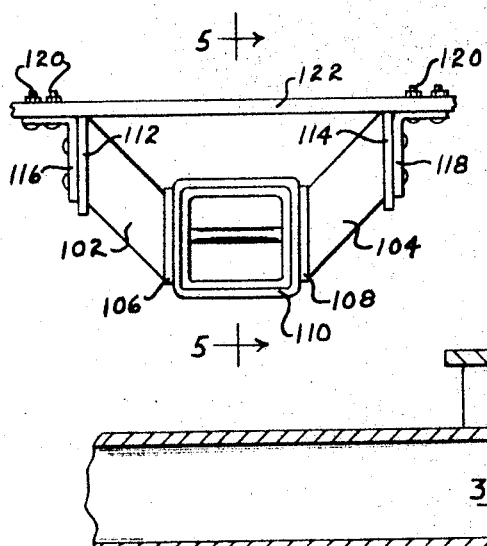
FIG. 4 is an enlarged rear end view of the draw bar.
Figure 5:
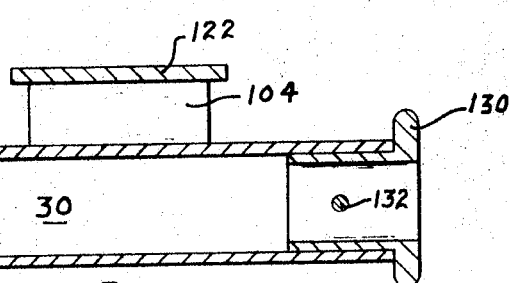
FIG. 5 is a vertical cross sectional view of the rear end of the draw bar, taken on line 5—5 of FIGURE 4.

Referring more specifically to the drawings and to FIGURES 1 and 2 in particular, numeral 10 designates generally the present draw bar and numeral 12 the rear portion of an automobile frame showing the upwardly curved portion 14 which traverses the rear axle 15 of the automobile. For the purpose of the description, the frame of the automobile will be considered conventional or standard, and includes in addition to curved portion 14, rear side members 16 and 18, and rear cross member 20 joined at its ends to members 16 and 18. Bumper 22 is shown mounted on the rear end of the frame.

The present draw bar consists of a longitudinal member 30 and transverse member 32 connected rigidly at its center to the forward end of longitudinal member 30, the two members being connected by welding, bolting, riveting or any other suitable securing means to form a rigid structure. In order to adjust longitudinal member 30 to various automobiles, it is constructed of a forward section 34 and a rear section 36 slipped over the rear part of section 34 and secured thereto by a pair of bolts 38 and 40 extending through a series of holes 42 in the sides of section 34. The desired length of member 30 may be obtained by slipping section 36 forwardly or rearwardly to the desired position and then bolting it in place with bolts 38 and 40. The transverse member 32 is adjusted to various widths of automobile frames by an intermediate section 50 and outer telescopic section 52 and 54 extending into opposite ends of section 50 and being secured therein by bolts 56 and 58 extending through a series of holes 60 and 61 in the respective ends of section 50 and respective telescopic sections 52 and 54. The two telescopic sections may be adjusted longitudinally in member 50 by removing bolts 56 and 58 and shifting the sections to the desired position and inserting the bolts in the matching holes.

The outer ends of sections 52 and 54 are attached to the frame by plates 62 and 64, respectively, by a plurality of bolts 66 extending through the plates and through the side of the frame adjacent the curved portion 14. The outer ends of the sections 52 and 54 are pivotedly connected to the plates by bolts 68 and 70 extending through the end plates 72 and 74 in the two end sections 52 and 54, respectively. The two bolts 68 and 70 form pivots or hinge means for the draw bar structure and are sufficiently strong to pull the towed vehicle under all road and load conditions normally encountered in such installations.

Since substantial force may be applied laterally to longitudinal member 32, reinforcing rod structures 80 and 82, connected to the outer ends of intermediate section 50 and to the rear of section 36, are used to form effective braces. Each of the two reinforcing rod structures consists of forward and rearward sections 84 and 86, the forward end of section 84 being connected by a pair of interlocking eyes 88 to bolt 56 and the rear end of rear section 86 being connected to member 36 by a pair of interlocking eyes 90. A turnbuckle 91 is interposed between sections 84 and 86 and is connected to the two sections 84 and 86 by interlocking eyes 92 and 94, respectively, and threaded bolts 96 and 98. After an adjustment has been made in the length of longitudinal member 30, the turnbuckles are tightened to hold the member rigidly in place. Since the two reinforcing members are the same in construction and operation, only one has been described in detail herein, and these reinforcing members have been omitted from FIGURES 1 and 2 to better show the remaining structure of the draw bar.

The rear end of longitudinal member 30 is held in floating relationship to the rear end of the automobile frame by a yieldable means consisting of two heavy resilient members 102 and 104 of rubber or rubber-like material. The inner ends of the two resilient members are secured to plates 106 and 108, respectively, which in turn are connected to ring 110 slidably received on the rear portion of section 36. The outer ends of the two rubber members are secured to plates 112 and 114, respectively, which in turn are bolted or riveted to brackets 116 and 118, respectively. The two brackets are secured by bolts 120 to a mounting plate 122 which in turn is bolted to the underside of the frame cross member 20 or to any other suitable supporting member at the rear of the automobile. The two resilient members 102 and 104 are joined to plates 106, 108, 112, and 114 by vulcanization or any other suitable securing process which permits the resilient member to remain yieldable and thereby permits longitudinal member 30 to, in effect, "float" beneath plate 122 and between brackets 116 and 118. A fixture 130 for mounting a hitch (not shown) is inserted in the open end of section 36 and is held in place there by bolt 132 extending through holes in section 36 and through holes in the fixture. Plate 122 is attached by a plurality of bolts 134, or by any other suitable securing means, to the frame or bumper and to the cross member 20 of the automobile frame.

In the use of the present draw bar, plates 62 and 64 are bolted to the frame 12 near the rear of curved portion 14 and plate 122 is secured to the center of cross member 20. In order to obtain the proper distance between plates 62 and 64, the bolts 56 and 58 are inserted in holes 60 and 61 after the plates have been mounted on the frame and transverse member 32 inserted therebetween. In order to obtain the required length of longitudinal member 30, the two bolts 38 and 40 are removed from the two sections 34 and 36 and, after the proper length is obtained, are reinserted in holes 42 and 44. After members 30 and 32 have been installed and secured to the frame in the foregoing manner, reinforcing rods with turnbuckles 91 are tightened to hold longitudinal member 30 rigidly in place with respect to transverse member 32. A hitch is then installed in fixture 130 and the trailer connected to the hitch. With the foregoing installation, the rubber members 102 and 104 permit the rear portion of longitudinal member 30 to, in effect, float beneath the automobile frame and bumper to adjust laterally and vertically to load and road conditions.

Figure 6:
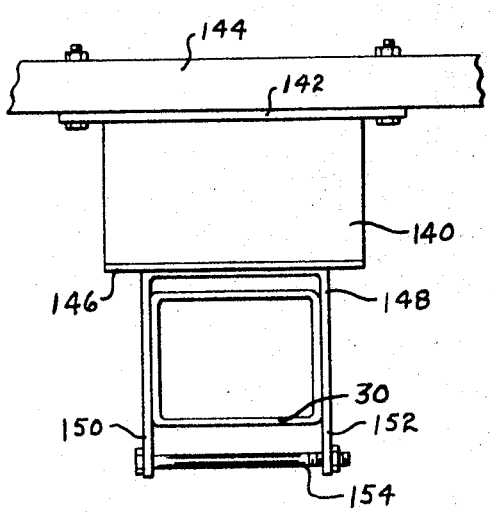
FIGURE 6 is an enlarged rear end view of the modified form of the present draw bar structure.
Figure 7:
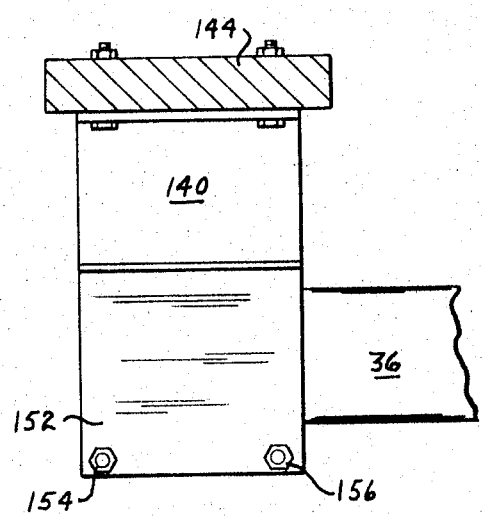
FIGURE 7 is a side elevational view of the modified form shown in FIGURE 6.

The embodiment of the invention illustrated in FIGURES 6 and 7 is similar in most respects to the first embodiment described herein, and includes longitudinal and transverse members 30 and 32 and reinforcing rods 80 and 82 as previously described. The structure for obtaining the floating action of the rear end of member 30 consists of a member 140 of rubber or other resilient material bonded to a plate 142 which in turn is secured to a base plate 144, the base plate being secured, by any suitable means, to the rear cross member of the automobile frame. The lower side of member 140 is bonded to a plate 146 which in turn is secured to a bracket 148. The bracket has two depending arms 150 and 152 which extend downwardly on opposite sides of section 36 of member 30, and bolts 154 and 156, extending through holes in the lower portion of each arm, clamp the two arms tightly against member 30, holding the section firmly therebetween. This structure permits resilient member 140 to act freely in obtaining the floating action of longitudinal member 30 beneath the bumper and rear frame cross member, thereby permitting the draw bar to adjust and adapt itself to varying load and road conditions.

While only two embodiments of the draw bar have been described in detail herein, various changes and modifications may be made without departing from the scope of the invention.

I claim:

1. A vehicle draw bar for mounting on an automobile, comprising a longitudinal member, means for connecting the forward end of said member to the automobile, an extensible and compressible resilient means of rubber-like material connected to said longitudinal member near the rear end thereof, and a means for connecting said resilient means to a supporting structure adjacent the rear of the automobile, said resilient means retaining the rear end of said longitudinal member in a suspended position and in a freely movable condition in all angular directions beneath said supporting structure.

2. A structure as defined in claim 1 wherein said automobile has a frame with two spaced side members and a rear cross member, and said means for connecting said longitudinal member to the automobile consists of a vertically positionaed plate secured to each side frame tending between said plates and supporting the forward end of said longitudinal member.

3. The structure defined in claim 2 in which said transverse member consists of a center member and two telescopic end members for rendering said transverse member extensible for mounting on automobile frames of various widths.

4. The structure defined in claim 1 in which said resilient means consists of a heavy rubber or rubber-like material being connected at one end to the rear end of said longitudinal member and at the other end to said supporting structure.

5. The structure as defined in claim 1 in which said resilient means consists of two laterally spaced resilient rubber-like members, a fixture for connecting the inner ends of said rubber-like members to said longitudinal member near the rear end thereof, a plate attached to said supporting structure, and two fixtures attached to the outer ends of the rubber-like members and joined to said plate.

6. A structure as defined in claim 5 wherein said automobile has a frame with two spaced side members and a rear cross member, and said means for connecting said longitudinal member to the automobile consists of a vertically positioned plate secured to each side frame member, and a transversely positioned member extending between said plates and supporting the forward end of said longitudinal member.

7. The structure as defined in claim 6 in which said transverse member consists of a center member and two telescopic end members for rendering said transverse member extensible for mounting on automobile frames of various widths.

8. The structure as defined in claim 6 in which two longitudinally adjustable reinforcing means extend angularly from a point near the rear en dof said longitudinal member to laterally spaced points along said transverse member.

9. The structure as defined in claim 1 in which said longitudinal member is adjustable longitudinally.

10. The structure as defined in claim 8 in which said longitudinal member is adjustable longitudinally.

References Cited

UNITED STATES PATENTS

| | | | |
|---|---|---|---|
| 2,700,554 | 1/1955 | Branstrator | 280—494 |
| 2,710,760 | 6/1955 | Branstrator | 280—494 |
| 2,772,893 | 12/1956 | Wettstein | 280—406 |
| 2,789,835 | 4/1957 | Ashton | 280—414 |
| 2,852,274 | 9/1958 | Seiley | 280—489 |
| 3,220,749 | 11/1965 | Mathisen | 280—406 |
| 3,284,098 | 11/1966 | Worley | 280—406 |

LEO FRIAGLIA, Primary Examiner

U.S. Cl. X.R.

280—482, 489